(12) United States Patent
Cho

(10) Patent No.: US 8,364,204 B2
(45) Date of Patent: Jan. 29, 2013

(54) DUAL-STANDBY PORTABLE TERMINAL AND METHOD FOR CONNECTING AUDIO PATH THEREOF

(75) Inventor: Jae-Rok Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 13/045,868

(22) Filed: Mar. 11, 2011

(65) Prior Publication Data

US 2011/0223866 A1    Sep. 15, 2011

(30) Foreign Application Priority Data

Mar. 15, 2010    (KR) .................. 10-2010-0022783

(51) Int. Cl.
*H04B 1/38*    (2006.01)
*H04B 7/00*    (2006.01)

(52) U.S. Cl. ........................ 455/558; 455/41.3

(58) Field of Classification Search ............ 455/558, 455/41.3, 552.1, 550.1, 73
See application file for complete search history.

(56) References Cited

U.S. PATENT DOCUMENTS

| 7,421,287 B2 * | 9/2008 | Cho et al. ............. 455/558 |
| 8,170,616 B2 * | 5/2012 | Lee ..................... 455/558 |
| 2010/0009716 A1 * | 1/2010 | Lee et al. ............. 455/558 |
| 2011/0269503 A1 * | 11/2011 | Park et al. ........... 455/552.1 |

* cited by examiner

*Primary Examiner* — Sonny Trinh
(74) *Attorney, Agent, or Firm* — Jefferson IP Law, LLP

(57) ABSTRACT

A dual-standby portable terminal and a method for connecting an audio path thereof are provided. A method for connecting an audio path of a dual-standby portable terminal capable of simultaneously accessing at least two communication networks includes determining whether a Subscriber Identification Module (SIM) should be switched while in a master SIM mode, switching to a slave SIM mode if it is determined that the SIM should be switched, and outputting audio signal data, received by a slave SIM control unit through a corresponding communication unit, to an audio output unit through an audio path operated by a master SIM control unit.

16 Claims, 3 Drawing Sheets

DUAL-STANDBY PORTABLE TERMINAL AND METHOD FOR CONNECTING AUDIO PATH THEREOF

PRIORITY

This application claims the benefit under 35 U.S.C. §119(a) of a Korean patent application filed in the Korean Intellectual Property Office on Mar. 15, 2010 and assigned Serial No. 10-2010-0022783, the entire disclosure of which is incorporated hereby incorporated by reference.

BACKGROUND OF THE INVENTION

1. Field of the Invention

The present invention relates to a dual-standby portable terminal capable of using heterogeneous networks. More particularly, the present invention relates to a dual-standby portable terminal and a method for connecting an audio path thereof, which does not utilize switching device to enter a slave Subscriber Identification Module (SIM) mode and does not require a tuning process.

2. Description of the Related Art

As the use of portable terminals increases, multifunctional portable terminals are being developed. Recently, multi-mode portable terminals capable of accessing two or more communication networks are being marketed.

The use of a single-mode portable terminal supporting one communication network enables communication only in the service area of a compatible communication network. However, the use of the multi-mode portable terminal enables communication in the service areas of two or more compatible communication networks. For example, the use of a dual-mode portable terminal supporting a Code Division Multiple Access (CDMA) network and a Global System for Mobile communication (GSM) network enables communication in both the service area of the CDMA network and the service area of the GSM network. Therefore, dual-mode portable terminals are more useful than single-mode portable terminals.

The dual-mode portable terminal switches between communication networks through a menu operation by entering an idle mode after completing a booting operation, thus requiring complex control and consuming much time.

Dual-standby portable terminals have been proposed to address the above problem. Unlike the dual-mode portable terminal, the dual-standby portable terminal can support the CDMA network and the GSM network simultaneously. The dual-standby portable terminal requests/receives a preamble and/or a pilot channel signal from the CDMA network and the GSM network periodically, even in an idle mode, to measure channel conditions (e.g., Received Signal Strength Indicator (RSSI), Carrier to Interference-plus-Noise Ratio (CINR), and Quality of Service (QoS)), thus supporting the two networks simultaneously.

The dual-standby portable terminal has two SIM modes that operate selectively in different frequency bands. For example, in a master SIM mode, a slave SIM switches into a sleep state. That is, the components of the portable terminal are controlled by a control unit activated in the master SIM mode. However, in a slave SIM mode, a master SIM is activated to control the components (e.g., a switching unit and a Bluetooth device) of the portable terminal.

In the slave SIM mode, received voice data undergo audio parameter tuning and are switched by a switching device to be connected to an audio path in the master SIM mode.

However, the additional switching device increases the size of the portable terminal, and the complex audio parameter tuning operation delays product development.

SUMMARY OF THE INVENTION

An aspect of the present invention is to address at least the above-mentioned problems and/or disadvantages and to provide at least the advantages described below. Accordingly, an aspect of the present invention is to provide a dual-standby portable terminal and a method for connecting an audio path thereof, which can exclude a switching device operating in a Subscriber Identification Module (SIM) switch mode, thereby making it possible to slim down the portable terminal.

Another aspect of the present invention is to provide a dual-standby portable terminal and a method for connecting an audio path thereof, which can exclude an audio parameter tuning process required in a slave SIM mode, thereby making it possible to reduce a product fabrication period and minimize a developer's loss.

In accordance with an aspect of the present invention, a dual-standby portable terminal is provided. The terminal includes a master SIM and a slave SIM configured to simultaneously access at least two communication networks, a first communication unit configured to operate the master SIM to perform a call with a counterpart terminal, a second communication unit configured to operate the slave SIM to perform a call with the counterpart entity, and a control unit, including a slave SIM control unit and a master SIM control unit, configured to output audio signal data, received by the slave SIM control unit through the second communication unit, to an audio output unit through an audio path operated by the master SIM control unit.

According to another aspect of the present invention, a method for connecting an audio path of a dual-standby portable terminal capable of simultaneously accessing at least two communication networks is provided. The method includes determining whether a SIM should be switched while in a master SIM mode, switching to a slave SIM mode if it is determined that the SIM should be switched, and outputting audio signal data, received by a slave SIM control unit through a corresponding communication unit, to an audio output unit through an audio path operated by a master SIM control unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF THE EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It should be noted that a dual-standby portable terminal according to an exemplary embodiment of the present invention may simultaneously access at least two communication networks based on different communication schemes, or may simultaneously access at least two communication networks provided by different communication service providers.

Figure 1:
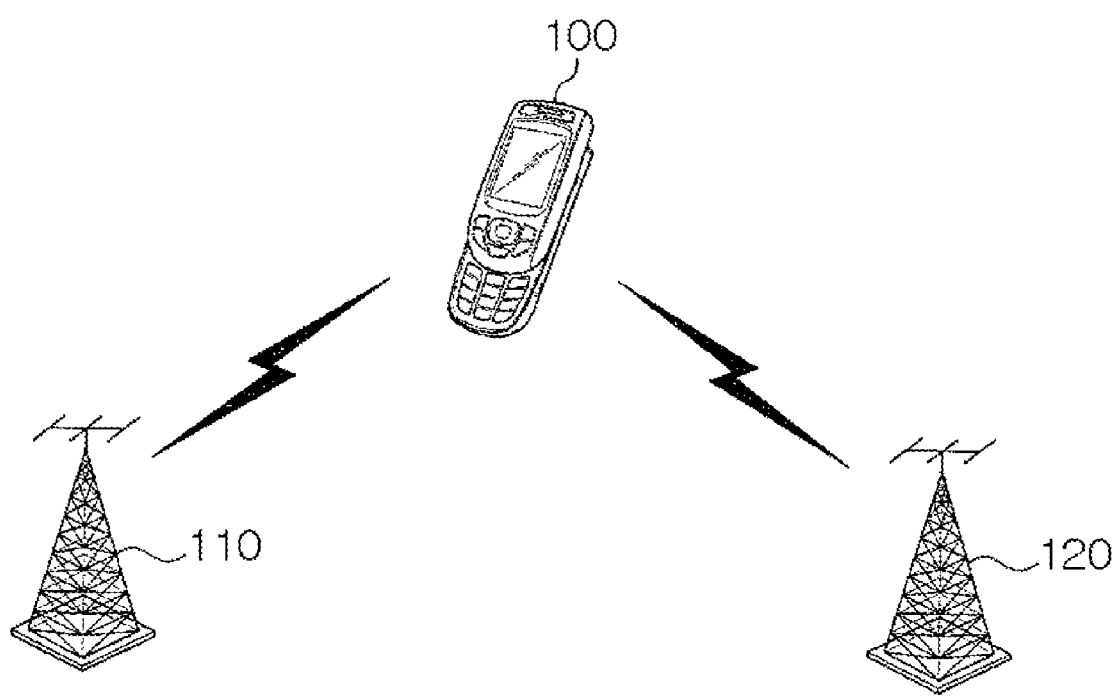
FIG. 1 is a schematic diagram of a mobile communication system including a dual-standby portable terminal according to an exemplary embodiment of the present invention.

FIG. 1 is a schematic diagram of a mobile communication system including a dual-standby portable terminal according to an exemplary embodiment of the present invention.

Referring to FIG. 1, a mobile communication system including a dual-standby portable terminal 100 according to an exemplary embodiment of the present invention includes a base station 110 of a first communication network provided by a first communication scheme/service provider, and a base station 120 of a second communication network provided by a second communication scheme/service provider.

The dual-standby portable terminal 100 may provide a voice call, a Short Message Service (SMS), a Multimedia Message Service (MMS), and an Enhanced Message Service (EMS), and may include a Moving Picture Experts Group (MPEG)-1 or MPEG-2 Audio Layer 3 (MP3) player to play music at a user's request. Also, the dual-standby portable terminal 100 may include an embedded camera to photograph a subject at a user's request.

As described above, the dual-standby portable terminal 100 may simultaneously access at least two communication networks based on different communication schemes, or may simultaneously access at least two communication networks provided by different communication service providers. Thus, the dual-standby portable terminal 100 may include two SIMs to access at least two communication networks. Hereinafter, it is assumed that the dual-standby portable terminal 100 includes two SIMs, namely a master SIM 206 and a slave SIM 207 as illustrated in FIG. 2.

For example, assume that the dual-standby portable terminal 100 is set to a master SIM mode for the first communication scheme/service provider, and the dual-standby portable terminal 100 transmits/receives a call to/from a counterpart terminal having a communication scheme/service provider that is different from the first communication scheme/service provider. Here, the dual-standby portable terminal 100 switches the SIM when it is determined that the SIM should be switched, that is, when the dual-standby portable terminal 100 receives a SIM switch request signal indicating that the communication scheme/service provider of the counterpart terminal is different from the first communication scheme/service provider. After switching to the slave SIM 207, the dual-standby portable terminal 100 operates the slave SIM 207 to transmit the call to the counterpart terminal. After transmitting/receiving a call through the slave SIM 207, if the communication scheme/service provider is identical, the dual-standby portable terminal 100 performs a call operation with the counterpart terminal.

If the dual-standby portable terminal 100 is in a slave SIM mode, an exemplary embodiment of the present invention does not perform a SIM switch operation and does not perform an audio parameter tuning operation for connecting an audio path used in a master SIM mode.

Figure 2:
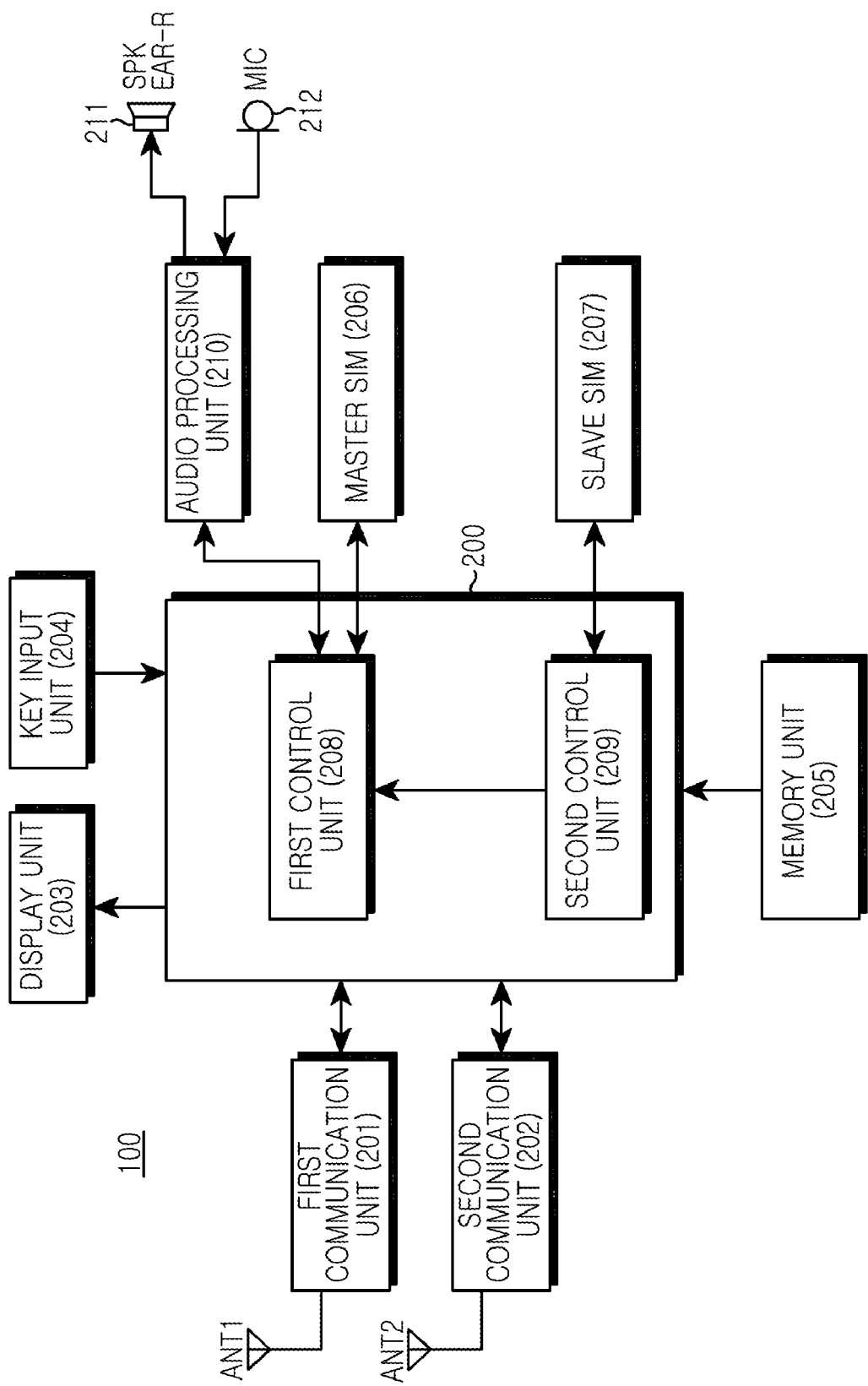
FIG. 2 is a block diagram of a dual-standby portable terminal according to an exemplary embodiment of the present invention.

FIG. 2 is a block diagram of a dual-standby portable terminal according to an exemplary embodiment of the present invention.

Referring to FIG. 2, a dual-standby portable terminal 100 according to an exemplary embodiment of the present invention includes a first communication unit 201, a second communication unit 202, a display unit 203, a key input unit 204, a memory unit 205, a master SIM 206, a slave SIM 207, and a control unit 200.

The first communication unit 201 and the second communication unit 202 are Radio Frequency (RF) units for performing a wireless communication function. The first/second communication unit 201/202 includes an RF transmitter configured to perform a frequency up-conversion operation and an amplification operation on a transmission (TX) signal, an RF receiver configured to perform a low-noise amplification operation and a frequency down-conversion operation on a received signal, and an antenna ANT1/ANT2 configured to transmit and receive radio waves.

When the dual-standby portable terminal 100 switches from a master SIM mode to a slave SIM mode, the display unit 203 may display an indication of the mode switch to the user.

The display unit 203 may be a Liquid Crystal Display (LCD) device. More specifically, the display unit 203 may be a touchscreen device including a Thin Film Transistor (TFT) LCD and a touch panel.

The key input unit 204 is configured to receive a control signal of the user to control an operation of the dual-standby portable terminal 100. According to an exemplary embodiment, the key input unit 204 is configured to perform control operations for call connection admission and call termination.

The memory unit 205 is configured to store information and programs used to operate the dual-standby portable terminal 100. According to an exemplary embodiment, the memory unit 205 may be configured to temporarily store audio signal information received by the second communication unit 202.

For example, the master SIM 206 and the slave SIM 207 may be dual-standby mode smart cards that support a Global System for Mobile communication (GSM) mode and a Code Division Multiple Access (CDMA) mode. If the master SIM 206 and the slave SIM 207 are smart cards for supporting a GSM mode and a CDMA mode, respectively, data related to the GSM mode and the CDMA mode are stored in the master SIM 206 and the slave SIM 207, respectively. The data may include authentication information and subscriber information used for GSM communication and CDMA communication and record information related to wireless communication.

The control unit 200 controls an overall operation of the dual-standby portable terminal 100. According to an exemplary embodiment, in a slave SIM mode of the dual-standby portable terminal 100, the control unit 200 transmits a received audio signal from a second control unit 209 to a first control unit 208.

When receiving a SIM switch request signal, the control unit 200 operates the slave SIM 207 to connect a call with a counterpart terminal. In this case, the control unit 200 may use a notification function (e.g., one or more of the activation of a pop-up window on the display unit, an alarm sound, a vibration, and an illumination of a light emitting device) to notify that the dual-standby portable terminal 100 operates in a slave SIM mode.

The control unit 200 includes a first control unit 208 and a second control unit 209. Each of the first and second control units 208 and 209 may include a modem. Among the first and second control units 208 and 209, the first control unit 208 operating the master SIM 206 may be set as a main control unit that controls an overall operation of the dual-standby portable terminal 100. The second control unit 209 interconnected with the slave SIM 207 may be used only for communication. The first and second control units 208 and 209 may be implemented as a chip type control unit mounted on a main board. Herein, the master SIM 206 may be used in conjunction with the first control unit 208 and thus may be referred to as a master SIM control unit. Similarly, the slave SIM 207 may be used in conjunction with the second control unit 209 and thus may be referred to as a slave SIM control unit.

For example, the audio processing unit 210 includes an audio codec. Signals to be transmitted through the first/second communication unit 201/202 are encoded and modulated by the first/second control unit 208/209 and signals received through the first/second communication unit 201/202 are demodulated and decoded by the first/second control unit 208/209, so that audio signals are outputted through a speaker unit 211 (including an earphone unit) or audio signals are inputted through a microphone unit 212.

Figure 3:
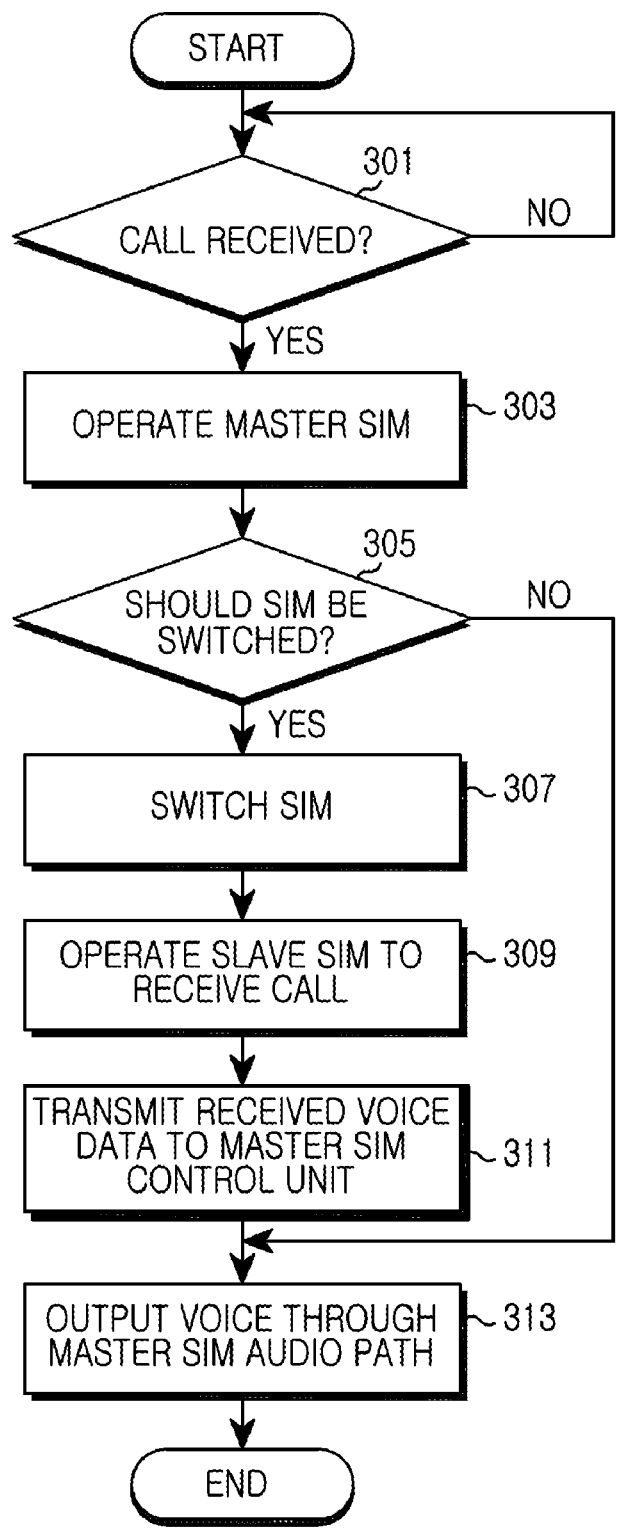
FIG. 3 is a flow diagram illustrating a method for connecting an audio path of a dual-standby portable terminal according to an exemplary embodiment of the present invention.

FIG. 3 is a flow diagram illustrating a method for connecting an audio path of a dual-standby portable terminal according to an exemplary embodiment of the present invention.

Referring to FIG. 3, in step 301, the control unit determines whether a call is received. If a call is received, the control unit proceeds to step 303. In step 303, it is assumed that the control unit operates the master SIM. At this point, the slave SIM and the second control unit may be in a sleep mode.

The control unit receives information about the corresponding communication network from the corresponding base station. If the master SIM is unsuitable for the corresponding communication network, the control unit determines in step 305 whether a SIM should be switched. That is, if the slave SIM is suitable for the corresponding communication network. If the slave SIM should be switched to, the control unit proceeds to step 307. In step 307, the control unit activates the second control unit and the slave SIM. In this case, the first control unit maintains an activation state to control an overall operation of the dual-standby portable terminal. That is, in step 309, the control unit activates a slave SIM mode to receive a call. Thereafter, the second control unit receives voice data through the second communication unit. Unlike the related art, the second control unit transmits untuned audio data to the first control unit through a predefined path in step 311. Thus, the first control unit controls voice to be outputted through a master SIM audio path in step 313. Returning to step 305, if the slave SIM should not be switched to, the control unit proceeds to step 313.

Although not illustrated in the drawings, a Bluetooth module may also be operated through the audio path used in the master SIM mode.

As described above, the exemplary embodiments of the present invention do not require an audio parameter tuning process and do not utilize a separate switching device to enter a slave SIM mode, thus making it possible to slim down a portable terminal. Also, the exemplary embodiments of the present invention can reduce a tuning time period, thus making it possible to improve the product competitiveness.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for connecting an audio path of a dual-standby portable terminal capable of accessing at least two communication networks, the method comprising:
   determining whether a Subscriber Identification Module (SIM) should be switched while in a master SIM mode;
   switching to a slave SIM mode if it is determined that the SIM should be switched; and
   outputting audio signal data, received by a slave SIM control unit through a corresponding communication unit, to an audio output unit through an audio path operated by a master SIM control unit.

2. The method of claim 1, wherein the audio signal data received by the slave SIM control unit does not undergo audio parameter tuning.

3. The method of claim 1, wherein the master SIM control unit is also activated when switching to the slave SIM mode.

4. The method of claim 1, wherein the audio output unit comprises one of a speakerphone, an earphone, and a Bluetooth headset of the dual-standby portable terminal.

5. The method of claim 1, wherein the determining of whether the SIM should be switched while in a master SIM mode comprises:
   receiving a SIM switch request signal indicating that one of a communication scheme and a service provider of a counterpart terminal is different from one of a communication scheme and a service provider corresponding to the master SIM mode.

6. The method of claim 1, wherein if it is determined that the SIM should not be switched, audio signal data, received by the master SIM control unit through a corresponding communication unit, is output to the audio output unit through the audio path operated by the master SIM control unit.

7. The method of claim 1, further comprising:
   when switching to the slave SIM mode, providing a notification of the switch to the slave SIM mode.

8. The method of claim 7, wherein the notification includes one or more of the activation of a pop-up window on the display unit, an alarm sound, a vibration, and an illumination of a light emitting device.

9. A dual-standby portable terminal comprising:

a master Subscriber Identification Module (SIM) and a slave SIM configured to simultaneously access at least two communication networks;

a first communication unit configured to operate the master SIM to perform a call with a counterpart terminal;

a second communication unit configured to operate the slave SIM to perform a call with the counterpart entity; and a control unit, including a slave SIM control unit and a master SIM control unit, configured to output audio signal data, received by the slave SIM control unit through the second communication unit, to an audio output unit through an audio path operated by the master SIM control unit.

10. The dual-standby portable terminal of claim 9, wherein the audio signal data received by the slave SIM control unit does not undergo audio parameter tuning.

11. The dual-standby portable terminal of claim 9, wherein the master SIM control unit is also activated when switching to the slave SIM mode.

12. The dual-standby portable terminal of claim 9, wherein the audio output unit is one of a speakerphone, an earphone, and a Bluetooth headset of the dual-standby portable terminal.

13. The dual-standby portable terminal of claim 9, wherein the control unit outputs the audio signal data, received through the second communication unit, to the audio output unit through the audio path operated by the master SIM control unit, when a SIM switch request signal is received indicating that one of a communication scheme and a service provider of a counterpart terminal is different from one of a communication scheme and a service provider corresponding to the master SIM.

14. The dual-standby portable terminal of claim 9, wherein the control unit outputs the audio signal data, received through the first communication unit, to an audio output unit through an audio path operated by a master SIM control unit.

15. The dual-standby portable terminal of claim 9, wherein, when the control unit outputs the audio signal data, received through the second communication unit, to the audio output unit through the audio path operated by the master SIM control unit, the control unit controls a notification of a switch to a slave SIM mode.

16. The dual-standby portable terminal of claim 15, wherein the notification includes one or more of the activation of a pop-up window on the display unit, an alarm sound, a vibration, and an illumination of a light emitting device.

* * * * *